US010408933B1

(12) United States Patent
DeHart et al.

(10) Patent No.: US 10,408,933 B1
(45) Date of Patent: Sep. 10, 2019

(54) SONAR IMAGING SYSTEM WITH LATERAL TARGET PLACEMENT AND MULTIPLE COLOR DISPLAY

(71) Applicants: Sean M. DeHart, Eufaula, AL (US); David A. Betts, Eufaula, AL (US); Zachary Thomas Jordan, Abbeville, AL (US); Jesus Carmona-Valdes, Eufaula, AL (US); Brian Lee Chase, Eufaula, AL (US); William Mark Gibson, Eufaula, AL (US)

(72) Inventors: Sean M. DeHart, Eufaula, AL (US); David A. Betts, Eufaula, AL (US); Zachary Thomas Jordan, Abbeville, AL (US); Jesus Carmona-Valdes, Eufaula, AL (US); Brian Lee Chase, Eufaula, AL (US); William Mark Gibson, Eufaula, AL (US)

(73) Assignee: Johnson Outdoors Inc., Racine, WI (US)

( * ) Notice: Subject to any disclaimer, the term of this patent is extended or adjusted under 35 U.S.C. 154(b) by 250 days.

(21) Appl. No.: 15/401,947

(22) Filed: Jan. 9, 2017

Related U.S. Application Data

(60) Provisional application No. 62/276,638, filed on Jan. 8, 2016, provisional application No. 62/308,001, filed on Mar. 14, 2016.

(51) Int. Cl.
*G01S 15/89* (2006.01)
*G01S 7/62* (2006.01)
(Continued)

(52) U.S. Cl.
CPC .......... *G01S 15/8902* (2013.01); *G01S 7/629* (2013.01); *G01S 7/6263* (2013.01); *G10K 11/006* (2013.01)

(58) Field of Classification Search
CPC .... G01S 15/8902; G01S 7/6263; G01S 7/629; G10K 11/006
See application file for complete search history.

(56) References Cited

U.S. PATENT DOCUMENTS 5,640,369 A * 6/1997 Capell, Sr. .......... G01S 7/52004
367/88
7,652,952 B2 1/2010 Betts et al.
(Continued)

OTHER PUBLICATIONS

Raymarine Dragonfly; Raymarine Dragonfly: A Whole New Breed of Fish Finder; internet; Feb. 21, 2013; 3 pages; http://www.boats.com/resources/raymarine-dragonfly-a-whole-new-breed-of-fish-finder/.

*Primary Examiner* — Daniel Pihulic
(74) *Attorney, Agent, or Firm* — Reinhart Boerner Van Deuren P.C.

(57) ABSTRACT

A sonar imaging system, that includes a control head with a user interface and a display unit for displaying a sonar-generated image, is provided. A sonar transducer assembly is coupled to the control head and configured to transmit sonar data to the control head. The sonar data is used to generate the sonar-generated image. The sonar transducer assembly includes a first side scan acoustic sonar element that transmits a sonar beam. The sonar transducer assembly further includes a plurality of sonar beam receiving elements. Each receiving element is arranged to receive a portion of the return beam from the first side scan acoustic sonar element. Each of the plurality of sonar beam receiving elements is configured to identify both a depth and a lateral distance of an underwater object relative to the position of the sonar transducer assembly.

28 Claims, 8 Drawing Sheets
(4 of 8 Drawing Sheet(s) Filed in Color)

(51) Int. Cl.
    *G01K 11/00*     (2006.01)
    *G10K 11/00*     (2006.01)

(56) References Cited

U.S. PATENT DOCUMENTS

| | | |
|---|---|---|
| 7,710,825 B2 | 5/2010 | Betts et al. |
| 7,729,203 B2 | 6/2010 | Betts et al. |
| 7,755,974 B2 | 7/2010 | Betts et al. |
| 2014/0269163 A1 | 9/2014 | Proctor |
| 2016/0223659 A1* | 8/2016 | Mandelert ............... G01S 7/539 |

* cited by examiner

SONAR IMAGING SYSTEM WITH LATERAL TARGET PLACEMENT AND MULTIPLE COLOR DISPLAY

CROSS-REFERENCE TO RELATED PATENT APPLICATIONS

This patent application claims the benefit of U.S. Provisional Patent Application No. 62/276,638, filed Jan. 8, 2016, and of U.S. Provisional Patent Application No. 62/308,001, filed Mar. 14, 2016, the entire teachings and disclosures of which are incorporated herein by reference thereto.

FIELD OF THE INVENTION

This invention generally relates to sonar imaging systems of the type often used by anglers and recreational boaters.

BACKGROUND OF THE INVENTION

Sonar devices that transmit sound waves have been used previously to obtain information about underwater articles, including fish, structures and obstructions, and the bottom. The sound waves travel from a transducer mounted to a bottom surface of the vessel through the water. The sound wave transmits from the sonar devices in diverging patterns. The sound waves contact underwater articles, which create return echoes. The transducer receives the return echoes and the sonar device analyzes the received echoes. A display device displays representations of the received echoes, for locating fish and other underwater articles.

The assignee of the instant application provides and has taught sonar imaging systems that are coupled to the watercraft to provide side scan images. Such systems include sonar imaging systems mountable to a motor (such as a trolling motor), a transom of the watercraft, or to the hull of the watercraft. These provide sonar imaging systems operable at multiple resonant frequencies for optimized performance at varying bottom depths. The teachings of such systems include those in U.S. Pat. No. 7,652,952 entitled, "Sonar Imaging System For Mounting To Watercraft", U.S. Pat. No. 7,710,825 entitled, "Side Scan Sonar Imaging System With Boat Position On Display", U.S. Pat. No. 7,729,203 entitled, "Side Scan Sonar Imaging System With Associated GPS Data", and U.S. Pat. No. 7,755,974 entitled, "Side Scan Sonar Imaging System With Enhancement", the teachings and disclosures of which are hereby incorporated in their entireties by reference thereto.

In conventional sonar imaging systems, the target, or underwater object, is located using one of several ways. In typical side-scan imaging arrangements, the target is indicated as being on a particular side of the boat, depending on which side-scan sonar beam contacts the target. In some multi-beam configurations, a sonar transmitting element and one or more sonar receiving elements are all elements are pointed the same direction. Complex calculations and time shifting are used to artificially angle the array to locate the target at a particular location with respect to the transducer elements. An interferometric arrangement uses phase data from two or more sonar receiving elements and complex calculations to locate a target. This method tends to be processor-intensive.

Embodiments of the present invention pertain to improvements in the state of the art with respect to sonar imaging systems. These and other advantages of the invention, as well as additional inventive features, will be apparent from the description of the invention provided herein.

BRIEF SUMMARY OF THE INVENTION

In one aspect, embodiments of the invention provide a sonar imaging system that includes a control head with a user interface and a display unit for displaying a sonar-generated image. A sonar transducer assembly is coupled to the control head. The sonar transducer assembly includes a first side scan acoustic imaging sonar element that transmits a sonar beam. The sonar transducer assembly further includes a plurality of sonar beam receiving elements. Each receiving element is arranged to receive a portion of the return beam from the first side scan acoustic sonar element. The arrangement of the plurality of sonar beam receiving elements is configured to identify both a depth and a lateral distance for an underwater object relative to the position of the sonar transducer assembly. Certain embodiments of the invention may also include a multiplexer coupled to each of the plurality of sonar beam receiving elements, the multiplexer configured to transmit, to the control head, signals from fewer than all of the plurality of sonar beam receiving elements. The control head may be configured to display the sonar data from each of the plurality of sonar beam receiving elements in a different color.

In certain embodiments, the control head is configured to display the sonar return signal from each of the acoustic sonar elements in a different color. However, in further embodiments, the sonar is generated and the returns are processed and controlled separately, either over a network through the display, over various wired networks, or via controls on the box which may or may not have a display. The display may be a tablet computer or cell phone controlling the sonar via wired means.

In a particular embodiment, each sonar beam receiving element is positioned at an angle different from that of any other plurality of sonar beam receiving element. In a more particular embodiment, the plurality of sonar beam receiving elements comprises four sonar beam receiving elements, each with an orientation angled from 15 to 25 degrees relative to any adjacent sonar beam receiving element. Each sonar beam receiving element may be angled such that it receives a portion of the return beam received by any adjacent sonar beam receiving element.

The sonar imaging system may also include a transducer housing with a plurality of angled interior surfaces configured to support and position each of the plurality of sonar beam receiving elements. In certain embodiments, an inner surface of the transducer housing includes a contoured portion such that each angled interior surface flows smoothly to an adjacent angled interior surface, the contoured portion of the inner surface of the transducer housing having no interruptions or discontinuities.

In some embodiments, the control head is configured to process signals from the plurality of sonar beam receiving elements, and to generate a sonar image for which a depth of a detected objected is indicated by a color or intensity of an icon that represents the detected object.

In the aforementioned embodiments, the side scan acoustic elements are used in conjunction with separate sonar beam receiving elements. However, in certain embodiments of the invention, the side-scan acoustic elements also function as the receiving elements. In these alternate embodiments, the sonar returns from each side scan acoustic element is displayed in a different color, for example, as an overlay on the same screen location. In some typical applications, the sonar beams from the side scan acoustic elements will overlap directly beneath the hull of the boat to which they are mounted. In this overlap region, the different colors for the side scan acoustic elements will blend to create a third color different from the original two colors.

For example, in a particular embodiment, the sonar transducer assembly comprises a second side scan acoustic sonar element, a first sonar beam from the first side scan acoustic imaging sonar element being directed in a different direction than a second sonar beam from the second side scan acoustic sonar element. In a more particular embodiment, a first sonar return from the first side scan acoustic imaging sonar element is rendered in a first color on the display unit, and a second sonar return from the second side scan acoustic imaging sonar element is rendered in a second color on the display unit. The second color is different from the first color. The sonar transducer assembly may be configured to mount to a hull of a boat, such that the two side scan acoustic sonar elements and eight sonar beam receiving elements provide signals to the control head to produce sonar images of the underwater regions to each side of the boat. The sonar images indicate a depth and lateral distance of an underwater object relative to a position of the boat.

In a further embodiment, the sonar transducer assembly includes four sonar beam receiving elements for each side scan acoustic sonar element, and each sonar beam receiving element is configured to receive a different portion of the return beam from its associated side scan acoustic sonar element. In some embodiments, there is at least some overlap between the received portions of the return beam for adjacent sonar beam receiving elements. Further, signals, provided to the control head by the plurality of sonar beam receiving elements, may be used to generate a 3-D underwater image. Alternatively, sonar return signals provided to the control head by the plurality of sonar beam receiving elements may be used to generate a topographical rendering of a lakebed, riverbed, or seabed.

In another aspect, the invention provides a method of sonar imaging that includes the steps of providing a sonar transducer assembly including a transducer assembly housing that houses a first side-scan acoustic sonar element configured to generate a laterally-directed sonar beam, and disposing a first plurality of sonar beam receiving elements in the transducer assembly housing. The first plurality of sonar beam receiving elements is configured to receive a different portion of the sonar return beam from the laterally-directed sonar beam. The method also includes routing signals from the plurality of sonar beam receiving elements to a control head coupled to the transducer assembly, where the control head has a display unit. The method calls for generating a sonar image for display on the display unit. The sonar image indicates a depth and lateral distance for an underwater object, relative to a position of the sonar transducer assembly. The method may also include rendering, on the display unit, the sonar returns from each of the first plurality of sonar beam receiving elements in a different color. Further, additional colors may be rendered in those regions where the sonar returns for two adjacent sonar beam receiving elements overlap In certain embodiments, the method calls for mounting the sonar transducer assembly to a hull of a boat. In another embodiment, the method includes disposing a second side-scan acoustic sonar element with a second plurality of sonar beam receiving elements in the sonar transducer assembly housing, the second plurality of sonar beam receiving elements configured to receive a different portion of a sonar return beam from a second laterally-directed sonar beam. The second laterally-directed sonar beam may be directed in a different direction than the first laterally-directed sonar beam.

In a particular embodiment, each of the plurality of sonar beam receiving elements configured to display its sonar data in a different color. Thus, depending on the number of receiving elements, the display may render an underwater object in six, eight, or ten different colors, for example, where each color provides some indication of the depth of the object or the lateral distance of the object from the transducer. Additionally, the color renderings on the display may include even more colors where the beams for adjacent sonar receiving elements overlap. In the alternate embodiment in which the side-scan acoustic sonar elements also function as the receiving elements, the method includes rendering sonar returns from the first side-scan acoustic sonar element in a first color, and rendering sonar returns from the second side-scan acoustic sonar element in a second color different from the first color, and the region where the two sonar beams overlap is rendered in a third color formed from the blending of the first two colors.

In this method, wherein there is at least some overlap between the received portions of the return beam for adjacent sonar beam receiving elements. The method may also include positioning each sonar beam receiving element at an angle that is different from that of any other sonar beam receiving element. Positioning each sonar beam receiving element may call for orienting each sonar beam receiving element at an angle from 15 to 25 degrees relative to any adjacent sonar beam receiving element.

The aforementioned method may also include providing a sonar transducer assembly that includes a transducer assembly housing with a plurality of angled interior surfaces configured to support and position each of the first plurality of sonar beam receiving elements. Furthermore, an inner surface of the transducer housing may include a contoured portion such that each angled interior surface flows smoothly to an adjacent angled interior surface. Also, the contoured portion of the inner surface of the transducer housing may have no interruptions or discontinuities.

In particular embodiments, the method includes generating a 3-D sonar image for display on the display unit. Further, generating a sonar image for display on the display unit may include generating a topographical rendering of a lakebed, riverbed, or seabed for display on the display unit. Additionally, generating a sonar image for display on the display unit may include generating a sonar image in which the depth of an underwater object is indicated by color or intensity of an icon representing the underwater object. The method may also include multiplexing the signals from the plurality of sonar beam receiving elements to the control head.

In certain embodiments, the method calls for mounting the sonar transducer assembly to a hull of a boat. In another embodiment, the method includes disposing a second side-scan acoustic sonar element with a second plurality of sonar beam receiving elements in the sonar transducer assembly housing, the second plurality of sonar beam receiving elements configured to receive a different portion of a sonar return beam from a second laterally-directed sonar beam. The second laterally-directed sonar beam may be directed in a different direction than the first laterally-directed sonar beam.

In another aspect, embodiments of the invention provide a method of sonar imaging that includes the steps of providing a sonar transducer assembly disposed within a transducer assembly housing. The transducer assembly housing houses a first side-scan acoustic sonar element configured to generate a laterally-directed sonar beam in a first direction, and a second side-scan acoustic sonar transducer configured to generate a laterally-directed sonar beam in a second direction different from the first direction. The second side-scan acoustic sonar element is directed to generate a second laterally directed beam which is in the same plane as the first beam, but primarily covers a different portion of the water. In particular embodiments, the two side-scan acoustic sonar elements are positioned so that there is some overlap between the beams.

The method also includes routing the sonar return signals from the sonar transducer assembly to a control head coupled to the transducer assembly, where the control head has a display unit. The method calls for generating a sonar image for display on the display unit. The method may also include rendering, on the display unit, the sonar returns from each of the side scan acoustic sonar elements in a different color at the same location on the display unit, and for blending those different colors where the sonar return beams overlap.

In a further embodiment, the method includes rendering, on the display unit, a cross-sectional view of the water in a transverse plane, with respect to the direction of movement for the transducer assembly. In a typical application, the plane is perpendicular to a boat's direction of travel. Multiple targets may be identified on the display and shown in the cross-sectional view within a specified radius of reliable sonar imaging. The calculated positions for the targets can be overlaid on the display to show their actual lateral distance from the transducer assembly.

In yet another aspect, embodiments of the invention provide a method of sonar imaging that includes the step of providing a sonar transducer assembly with a transducer assembly housing that houses a first side-scan acoustic sonar element configured to generate a first laterally-directed sonar beam in a first direction, and a second side-scan acoustic sonar element configured to generate a second laterally-directed sonar beam in a second direction different from the first direction. The first and second side-scan acoustic sonar elements are positioned such that there is some overlap between the first and second laterally-directed sonar beams. The method further includes routing signals from the plurality of sonar beam elements to a control head coupled to the transducer assembly. The control head has a display unit. The method also requires rendering a multi-color sonar image for display on the display unit. Sonar beam returns from each of the first and second side-scan acoustic sonar elements are rendered in a different color.

In a particular embodiment of the invention, an underwater object located in an underwater region corresponding to the overlap between the first and second laterally-directed sonar beams is rendered on the display unit by blending the different colors at the same location on the display unit.

Other aspects, objectives and advantages of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
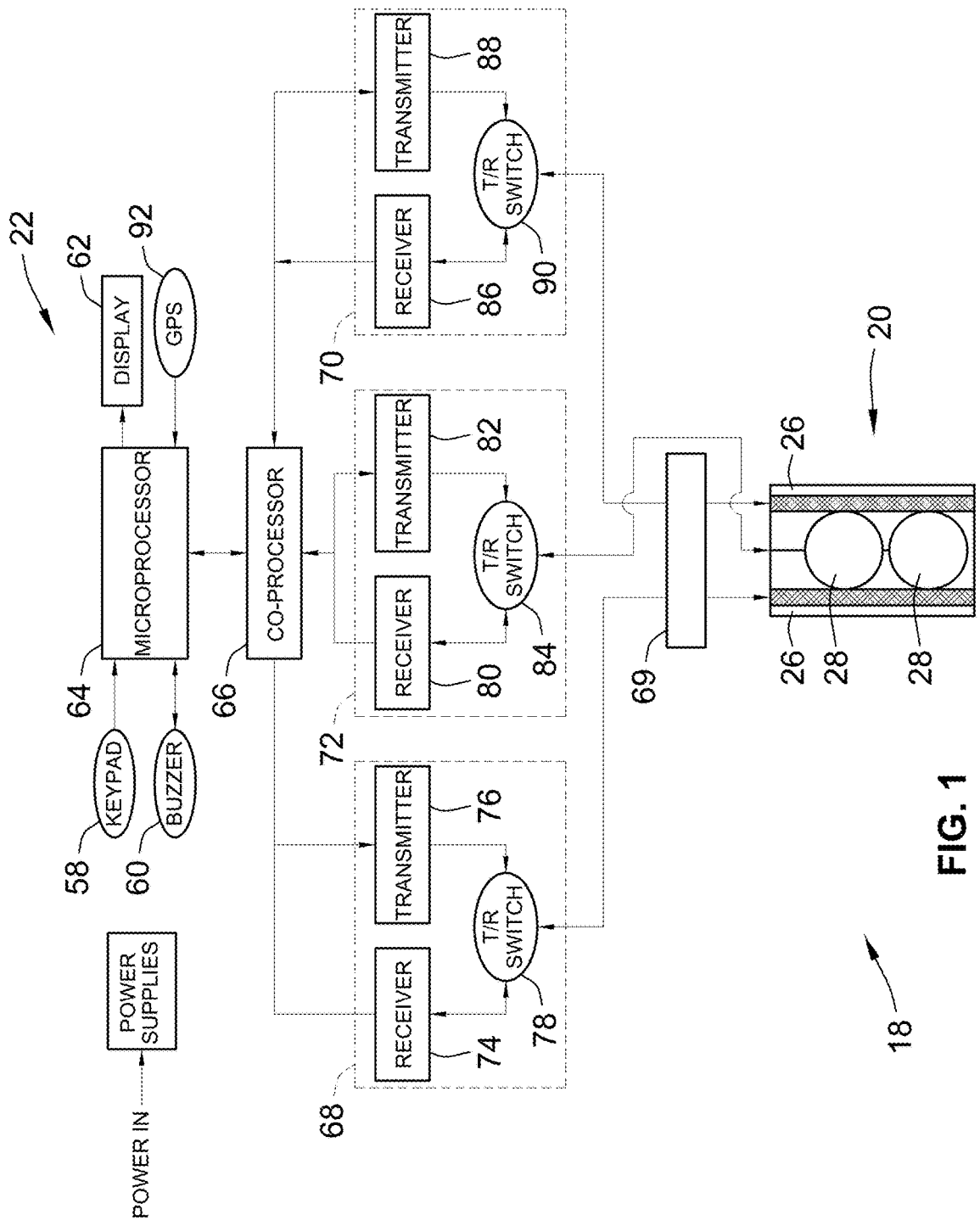
FIG. 1 is a simplified system block diagram of an embodiment of the sonar imaging system of the present invention.

FIG. 1 is a simplified system block diagram of a sonar imaging system 18, in accordance with an embodiment of the present invention. In this embodiment, the electronic control head unit 22 is coupled to a power supply and includes a user interface (58, 60 and 62), a microprocessor 64, and a co-processor 66. The electronic control head unit 22 is coupled to a first side scan circuit 68, a second side scan circuit 70, and a bottom scan circuit 72. The user interface is configured to allow for user inputs through a display menu that includes parameters such as depth range, sensitivity, fish alarm, and the like. In some embodiments such as shown in FIG. 1, the user interface comprises a keypad 58, buzzer 60, and display 62. Alternatively, the user interface may have switches or push buttons, or the like.

The first side scan circuit 68, second side scan circuit 70, and bottom scan circuit 72 are each coupled to a sonar transducer assembly 20 having two or more side scan sonar elements 26 (e.g., one side scan sonar element for the left side of the boat 105 and one for the right side of the boat 105) and one or more downward-scanning sonar elements 28. Typically, the sonar transducer assembly 20 is mounted to a bottom portion of a boat hull. In the embodiment of FIG. 1, the first side scan circuit 68, second side scan circuit 70, and bottom scan circuit 72 are coupled to the sonar transducer assembly 20 through a multiplexer 69. Side-scan sonar elements 26 typically generate fan-shaped beam that is wide in the across-track dimension (i.e., perpendicular to the boat's direction of travel) and narrow in the along-track dimension (i.e., parallel to the boat's direction of travel). In typical applications the side-scan sonar beam is about 0.25°-5° degrees in the along-track direction, and about 30°-120° in the across-track direction, when measured at the 3 dB down points.

In a particular embodiment, the sonar transducer assembly 20 is plugged into a module, such as the co-processor 66, which generates the sonar signals and analyzes the sonar beam returns. The sonar returns could then be transmitted to the display 62 (shown in FIG. 1) over a wireless network, wired network, or via a wired display cable. The aforementioned module could include the display 62, but does not necessarily have to. The display 62 could be on a tablet computer or cellular phone which receives signals from the module to generate the sonar image.

In certain embodiments of the invention, the side-scan acoustic elements 26 also function as the sonar beam receiving elements. In these alternate embodiments, the sonar returns from each side-scan acoustic element 26 is displayed in a different color. Furthermore, in some typical applications, the sonar beams from the side scan acoustic elements 26 will overlap directly beneath the hull of the boat to which they are mounted. The sonar beams from the side scan acoustic elements 26 may overlap with each other, or with a sonar beam from the downward-scanning sonar element 28. In this overlap region, the different colors for the side scan acoustic elements 26 will blend to create at least a third color different from the original two colors.

For example, the sonar data from the two side scan beams may be painted in different colors in the same location on the display unit 62 (shown in FIG. 1), so that the colors are effectively added or blended together. This allows the underwater object, or target, to be placed in one of three areas, the left beam, the right beam, or in the overlap between the beams. In an embodiment in which the side-scan acoustic sonar elements 26 (shown in FIG. 1) also function as the receiving elements, the method includes rendering sonar returns from the first side-scan acoustic sonar element 26 in a first color, and rendering sonar returns from the second side-scan acoustic sonar element 26 in a second color different from the first color, and the region where the two sonar beams overlap is rendered in at least a third color formed from the blending of the first two colors.

In a particular embodiment, the left side-scan sonar beam may be displayed as red, while the right side-scan sonar beam may be displayed as green. If, for example, the left-side sonar return has a first intensity of 50 and the right-side sonar return has a second intensity of 60, the display will paint these returns to the same pixel on the display, the color is [50,60,0] (red, green, blue), which is a slightly greenish yellow. This color indicates that there is a target at the distance indicated that is just to the right of the centerline of the sonar transducer assembly 20 (shown in FIG. 1). This can be determined without having to do any complex calculations on the sonar data to determine location.

Figure 2:
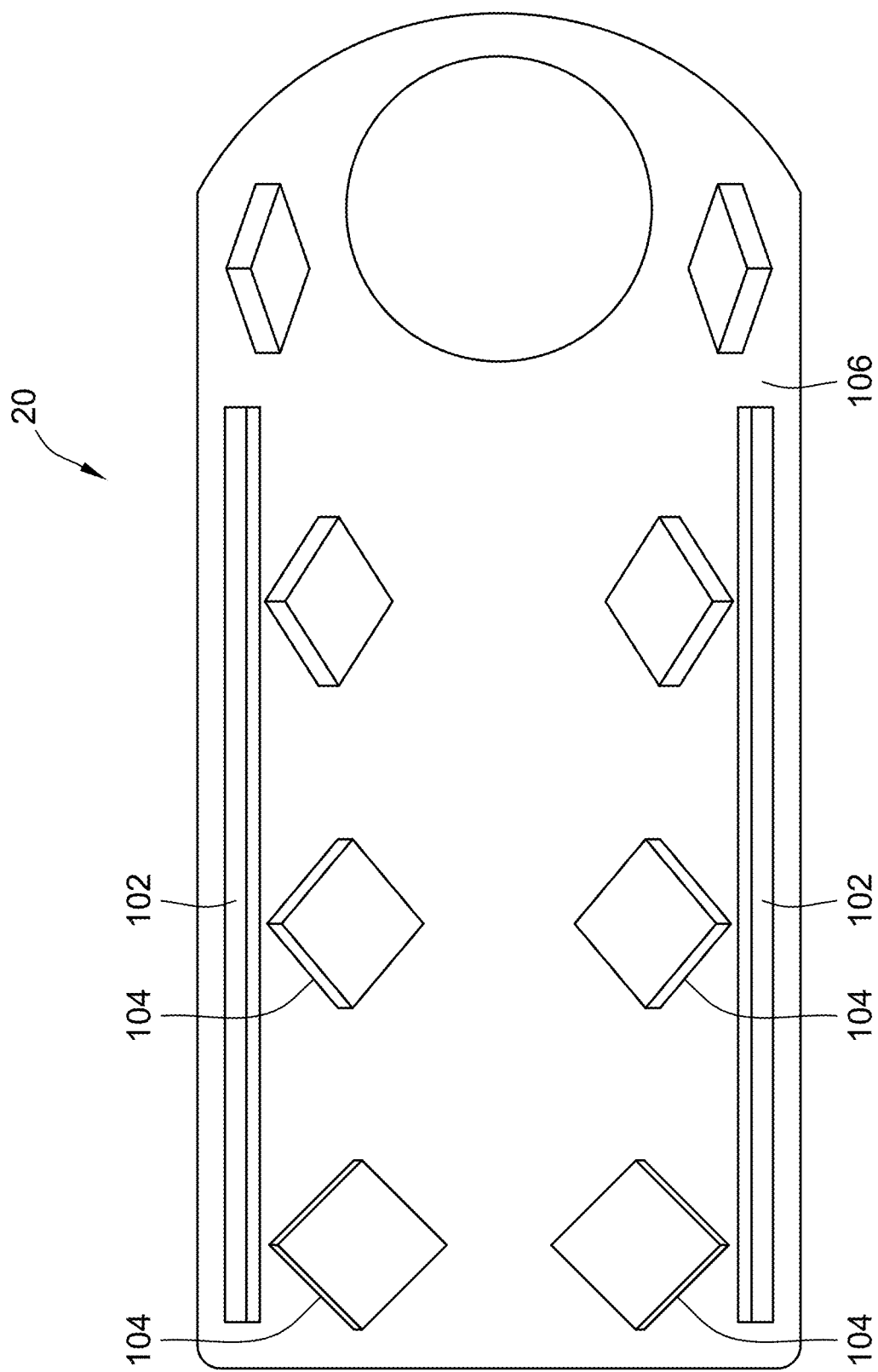
FIG. 2 is a perspective view of the transducer assembly, constructed in accordance with an embodiment of the invention.

FIG. 2 illustrates a perspective view of the sonar transducer assembly 20, constructed in accordance with a further embodiment of the invention. The sonar transducer assembly 20 of FIG. 2 includes two acoustic sonar beam generating elements 102 (e.g., side-scan sonar elements) disposed in a transducer assembly housing 106. In this particular embodiment, the acoustic sonar beam generating elements 102 are side scan elements; one on each side of the sonar transducer assembly 20. Thus, one acoustic sonar beam generating element 102 would direct its beam to the left side of the boat 105, and one acoustic sonar beam generating element 102 would direct its beam to the right side of the boat 105. In certain embodiments, the sonar transducer assembly 20 also includes one or more downward-scanning sonar elements 28 (shown in FIG. 1). Each acoustic sonar beam generating element 102 has one or more associated receiving elements 104.

A typical embodiment may include a plurality of sonar beam receiving elements 104. In the embodiment shown, each acoustic sonar beam generating element 102 has four sonar beam receiving elements 104 along each of the two sides of the sonar transducer assembly 20. Alternate embodiments of the invention may have more or fewer than four sonar beam receiving elements 104. The sonar beam receiving elements 104 may be configured to process either fan-shaped or conical sonar beam returns. However, in each embodiment, the sonar beam angle for the receiving element 104 is smaller, in the across-track dimension, than that of sonar beam generating element 102. A typical across-track sonar beam angle for the sonar beam angle for the receiving element 104 is between 10 and 25 degrees.

Each of the four sonar beam receiving elements 104 on a side is oriented at a different angle so as to receive a different portion of the return sonar beam. The transducer assembly housing 106 may also include a plurality of angled interior surfaces configured to support and position each of the plurality of sonar beam receiving elements 104. While the angled interior surfaces are not clearly shown in FIG. 2, these surfaces support the plurality of sonar beam receiving elements 104 in the angled orientations shown in FIG. 2. In certain embodiments, an inner surface of the transducer assembly housing 106 includes a contoured portion such that each angled interior surface flows smoothly to an adjacent angled interior surface, the contoured portion of the inner surface of the transducer assembly housing 106 having no interruptions or discontinuities.

Using mathematical calculations, a lateral distance from the transducer assembly 20 (shown in FIG. 1) and a target depth from the transducer assembly 20 can be determined. Alternatively, the same color blending method as described above may be used. This involves assigning each of the sonar beam receiving elements 104 a different color. Because there is some overlap between the sonar beam returns, the colors blend together where these returns overlap. Blended colors indicate a particular angle down from the surface corresponding to the angle of the associated sonar beam receiving element 104. Using this color information and a calculated distance, a depth and lateral distance from the transducer assembly 20 can be determined. It is also envisioned that embodiments of the invention will allow the user to switch from an angle-down-from-the-surface color indication to a depth color indication using a lookup table. An additional advantage here is that new colors are added on top of old colors on the display 62.

In a particular embodiment, each of the plurality of sonar beam receiving elements 104 is configured to display its sonar data in a different color. The sonar data is routed to the display 62 of the control head unit 22 (shown in FIG. 1). And depending on the number of receiving elements 104, the display 62 may render an underwater object in six, eight, or ten different colors, for example, where each color provides some indication of the depth of the object or the lateral distance of the object from the transducer assembly 20. Additionally, the color renderings on the display 62 may include even more colors where the beams for adjacent sonar receiving elements 104 overlap.

Figure 3:
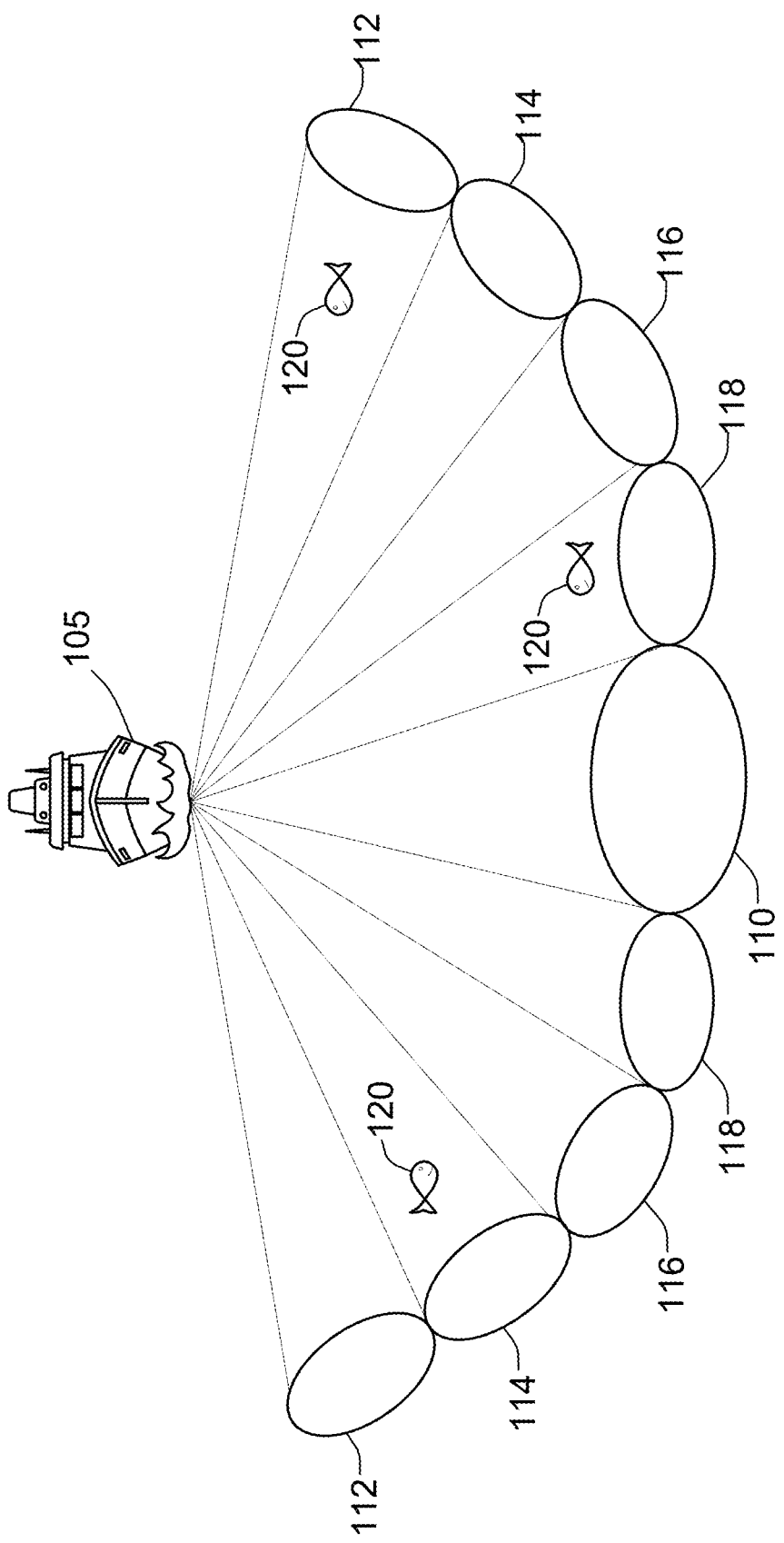
FIG. 3 is a schematic illustration of a plurality of sonar beam returns for a boat incorporating the sonar imaging system, constructed in accordance with an embodiment of the invention.

FIG. 3 provides an illustration showing how the four sonar receiving elements 104 on each side of the sonar transducer assembly 20 receive a portion of the sonar beam return signal. In this embodiment, the acoustic sonar beam generating element 102 is configured to generate a fan-shaped beam having an arc of up to 90 degrees, though in some embodiments may be less than 90 degrees. FIG. 3 shows the downward sonar return 110 and four side receive-only element return portions 112-118. The arc for each of the four side scan sonar return portions 112-118 could range from 10 to 30 degrees. Though not shown in FIG. 3, the four side scan sonar return portions 112-118 could each overlap with adjacent sonar return portions 112-118. Side scan sonar return portions 118 could also overlap with the downward scan sonar return 110. Certain specific embodiments of the invention include a plurality of sonar beam receiving elements 104 configured to receive a plurality of overlapping return signals.

The sonar imaging system 18 transmits the acoustic wave beam, which results in a plurality of sonar beam returns 112-118 from the side scan sonar elements 102 (shown in FIG. 2) and the acoustic wave beam return 110 from downward scan sonar elements 28 (shown in FIG. 1). The acoustic wave beams propagate to the bottom surface and are reflected as a sonar return signal. The transducer assembly 20 communicates the plurality of received sonar returns 112-118 to the plurality of sonar beam receiving elements 104. A bottom depth is determined, and in the illustrated embodiment, the depth is displayed on the display 62 (shown in FIG. 1) as well as provided to microprocessor 64 (shown in FIG. 1) for evaluating the duration. In some embodiments, the control head unit 22 is configured to process signals from the plurality of sonar beam receiving elements 104, and to generate a sonar image for which a depth of a detected objected is indicated by the color or intensity of an icon that represents the detected object. Further, signals, provided to the control head unit 22 by the plurality of sonar beam receiving elements 104, may be used to generate a 3-D underwater image. Alternatively, signals, provided to the control head unit 22 by the plurality of sonar beam receiving elements 104, may be used to generate a topographical rendering of a lakebed, riverbed, or seabed.

In embodiments of the invention, the plurality of sonar beam receiving elements 104 is configured to identify both a depth and a lateral distance of an underwater object 120 relative to the position of the sonar transducer assembly 20. By providing a plurality of sonar beam receiving elements 104 to receive a portion of each sonar beam return, it is possible to more accurately pinpoint the depth and lateral distance of the underwater object 120, such as a fish or school of fish for example. The plurality of sonar beam receiving elements 104 act to position the underwater object 120 both vertically and horizontally in the water column. Furthermore, in those systems configured such that the because of the side scan sonar return portions 112-118 overlap, some underwater objects 120 may be detected in the sonar beam return signal of two adjacent sonar beam receiving elements 104.

Referring again to FIG. 1, a multiplexer 69 is coupled between the sonar transducer assembly 20 and each of the first and second side scan circuits 68, 70. The multiplexer 69 is configured to select from among the plurality of signals from the plurality of sonar beam receiving elements 104. For example, the multiplexer 69 could be controlled by the microprocessor 64 to provide the co-processor 66 with the return signal 112, then the return signal 114, the return signal 116, and the return signal 118 in succession. By isolating the signals from the plurality of sonar beam receiving elements, the microprocessor 64 can readily determine a depth and lateral distance to underwater objects 20.

The microprocessor 64 is coupled to the user interface and is configured to process the data from the co-processor 66 (e.g., control the displayed information, format the information for display, run the operational algorithms, etc.). The microprocessor 64 can be a microcontroller, application-specific integrated circuit (ASIC) or other digital and/or analog circuitry configured to perform various input/output, control, analysis, and other functions described herein. In one embodiment, the microprocessor 64 includes a memory (e.g., non-volatile memory) configurable with software to perform the functions disclosed herein. The microprocessor 64 of the electronic control head unit 22 implements programmed algorithms (e.g., differential amplitude filtering (eliminate engine spark noise), time variable gain optimization-for best image, fish finding algorithms, anti-ringing pulse on transmit for better resolution, and use of down-beam depth to correct slant angle range information). According to a particular embodiment, a software filter algorithm is provided to filter certain noise common to operation of watercraft (and noise caused by sparkplug in particular).

During operation of the sonar imaging system 18 in accordance with a particular embodiment, amplitude readings are taken approximately every 0.75 inches, such that 100 feet of depth has 1600 readings. The 0.75-inch-amplitude readings from the last transmit/receive cycle (T/R cycle) are saved into computer memory. For each of these 0.75-inch-amplitude readings, including present and previous amplitude readings, the software conducts the following test: Is "present reading"–"previous reading">x. If "Yes", then substitute "previous reading" for "present reading". If "No", then use the "present reading". The microprocessor 64 is also configured to filter the signals, sort sonar target returns from the bottom and fish, calculate display range parameters, and then feed the processed signals to the screen of display 62. The display 62 is preferably a graphic display, such as an LCD for example, but not limited on the pixel order. Other displays such as LED, flasher, A-scope, and digital segment may alternatively be used. The electronic control head unit 22 may be powered by batteries (e.g., its own dedicated batteries, marine battery, etc.) or any other suitable means of generating electrical shipboard power (e.g., generator, solar power, fuel cell, etc.).

In the embodiment of FIG. 1, the co-processor 66 is coupled to the microprocessor 64 and is configured to collect, process, and pass data to the microprocessor 64 (e.g., generate the transmission frequencies, convert the analog data to digital with A/D converter and send to the microprocessor 64). The co-processor 66 can be a microcontroller, application-specific integrated circuit (ASIC) or other digital and/or analog circuitry configured to perform the functions disclosed herein. In one embodiment, the co-processor 66 includes a memory (e.g., non-volatile memory) configurable with software to perform the functions disclosed herein.

The first side scan circuit 68 has a receiver circuit 74, a transmitter circuit 76 that controls transmission of the sonar beam, and a transmit/receive switch (i.e., T/R switch 78). The second side scan circuit 70 is coupled to the co-processor 66, and is configured to operate the other side scan element. The second side scan circuit 70 has a receiver circuit 86, a transmitter circuit 88, and a transmit/receive switch (i.e., T/R switch 90). The bottom scan circuit 72 is coupled to the co-processor 66 and is configured to operate the bottom scan element. The bottom scan circuit 72 comprises a receiver circuit 80, a transmitter circuit 82, and a transmit/receive switch (i.e., T/R switch 84).

The receiver circuits 74, 80, 86 are each configured to amplify the sonar beam return signal and conduct signal filtering, base banding-rectification (e.g., remove carrier frequency), and logarithmic conversions (e.g., to obtain a wide range at output) and preferably provide variable receiver bandwidth. The transmitter circuits 76, 82, 88 are configured to generate signals that initiate generation of the sonar beams and, preferably, provide variable transmit power and, preferably, at a high voltage. The T/R switches 78, 84, 90 are configured to switch the first side scan circuit 68, second side scan circuit 70, and bottom scan circuit 72 between transmit and receive modes.

According to a particular embodiment, the electronic control head unit 22 is configured to operate at one or more resonant frequencies, depending on the intended depth and desired resolution. Such a multiple-frequency operation is intended to make up for shortcomings of mounting the transducer assembly 20 to the watercraft 10 caused by the varying distance between the transducer assembly 20 and the bottom 16 of the water 14. According to a more particular embodiment, the transducer assembly 20 may have dual-resonant frequency and side scan acoustic imaging elements with dimensions of about 4.5 by about 0.25 inch. Other embodiments of the invention may use a quad-beam or even a six-beam arrangement. In certain embodiments, at least one view of the display 62 shows both the down beam imaging and side scan imaging. This provides the ability to better relate length of shadow information to the size of the underwater target.

The plurality of receiver circuits 74, 80, 86 begin listening for sonar returns through the transducer assembly 20. At a predetermined proportion of the travel time, the sonar beam returns reach a point near the transducer assembly 20. The sonar beam returns from the bottom reflection carries details about the bottom. The microprocessor 64 directs the switches 78, 84, 90 to change the mode of operation from transmit mode to receive mode. The receiver circuits 74, 80, 86 are then activated to receive the sonar beam return signals from the plurality of sonar beam receiving elements 104. The sonar imaging system 18 continues receiving in the narrow or wide acoustic wave beam mode, until the start of the next T/R cycle. The received sonar returns are processed by the controller for display of representative symbols on the display 62. The T/R cycle then repeats with the newly determined depth from the prior cycle.

The sonar images from the down beam and side scan elements are then displayed on the display 62. These images may be shown in grey-scale or in color. The location of the watercraft 10 may also be shown in the image. If the user chooses to only display the down beam sonar information, historic information is typically shown to the left of the location of the watercraft 10. As such, the display 62 shows images to the bottom of the watercraft 10 that are even with and behind the watercraft 10 when the watercraft 10 is traveling forward. The user may also display only the side scan sonar images, only those from one side scan element, or images from both sides and the bottom. The display 62 may also be configured (or configurable) to indicate information such as depth, and speed of the watercraft 10, range, etc.

In a highly preferred embodiment, a GPS receiver 92 is also included to provide location information to the microprocessor 64. This information may be used to provide charting and other navigational functions. To provide even more accurate images, the system of the present invention provides the offset necessary to account for the X and Y distance between the side imaging transducer assembly 20 and the GPS antenna. In one embodiment, a cursor mode allows a user to move a cursor on the display 62 over a target of interest on the screen image and set a waypoint for the location of the structure. The GPS history may be used to determine the distance back and the sonar may be used to determine the distance to the side. The GPS speed is used in one embodiment to provide the screen scroll rate to provide more accurate front to back target dimensions. Without GPS or a speed sensor a fast scroll rate and a slow boat speed will elongate targets and a slow scroll rate and a fast boat speed will shorten targets. The corners of screen captures can be marked so that large area composite mosaic images can be generated in the electronic control head unit 22 or post-processed later. Preferably, one view that shows both side imaging and navigation information is provided. This makes it easier to follow tracks and provide efficient area coverage.

Figure 4:
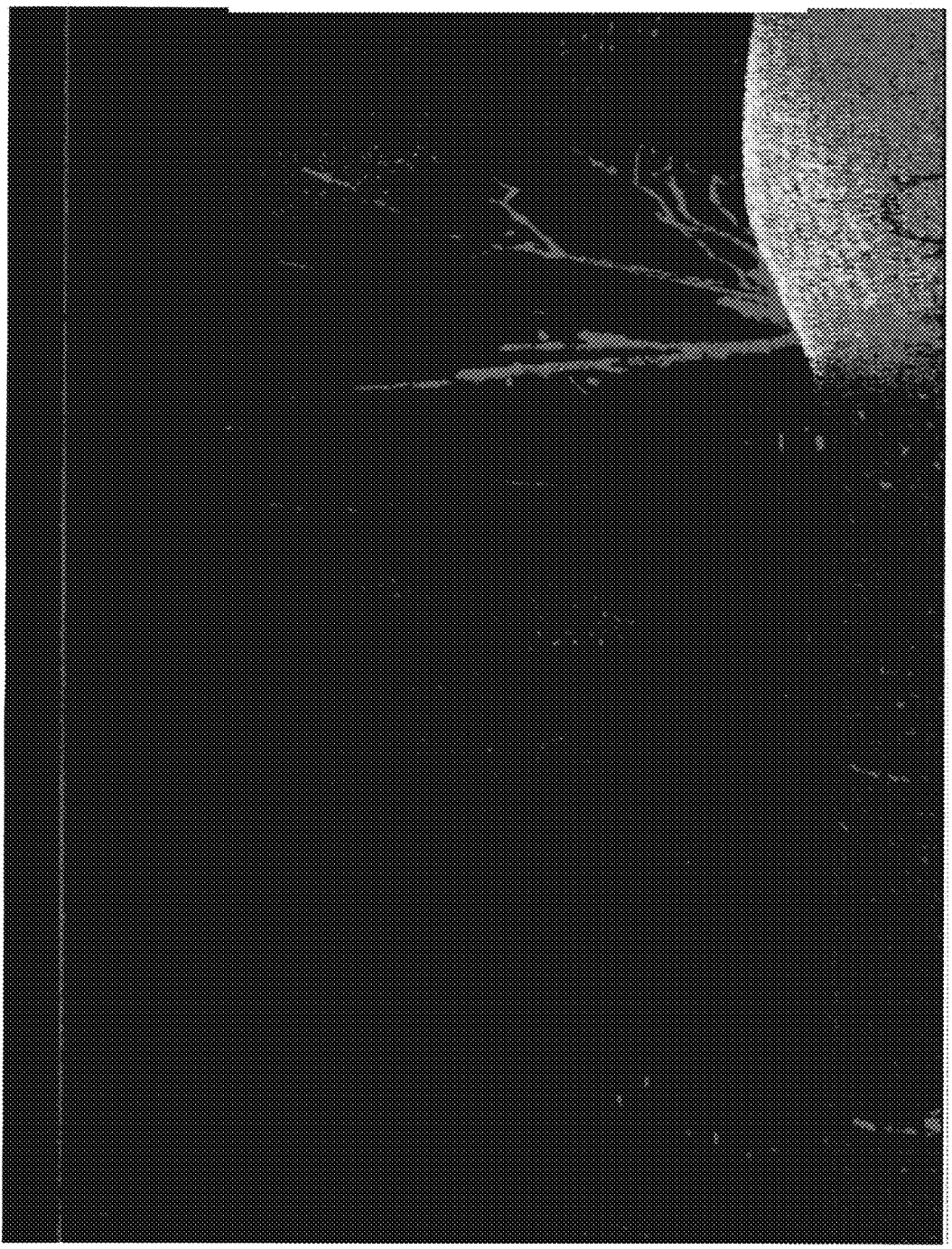
FIGS. 4-7 are sonar images rendered in color, as would be generated by a sonar imaging system constructed in accordance with various embodiments of the invention.
Figure 5:
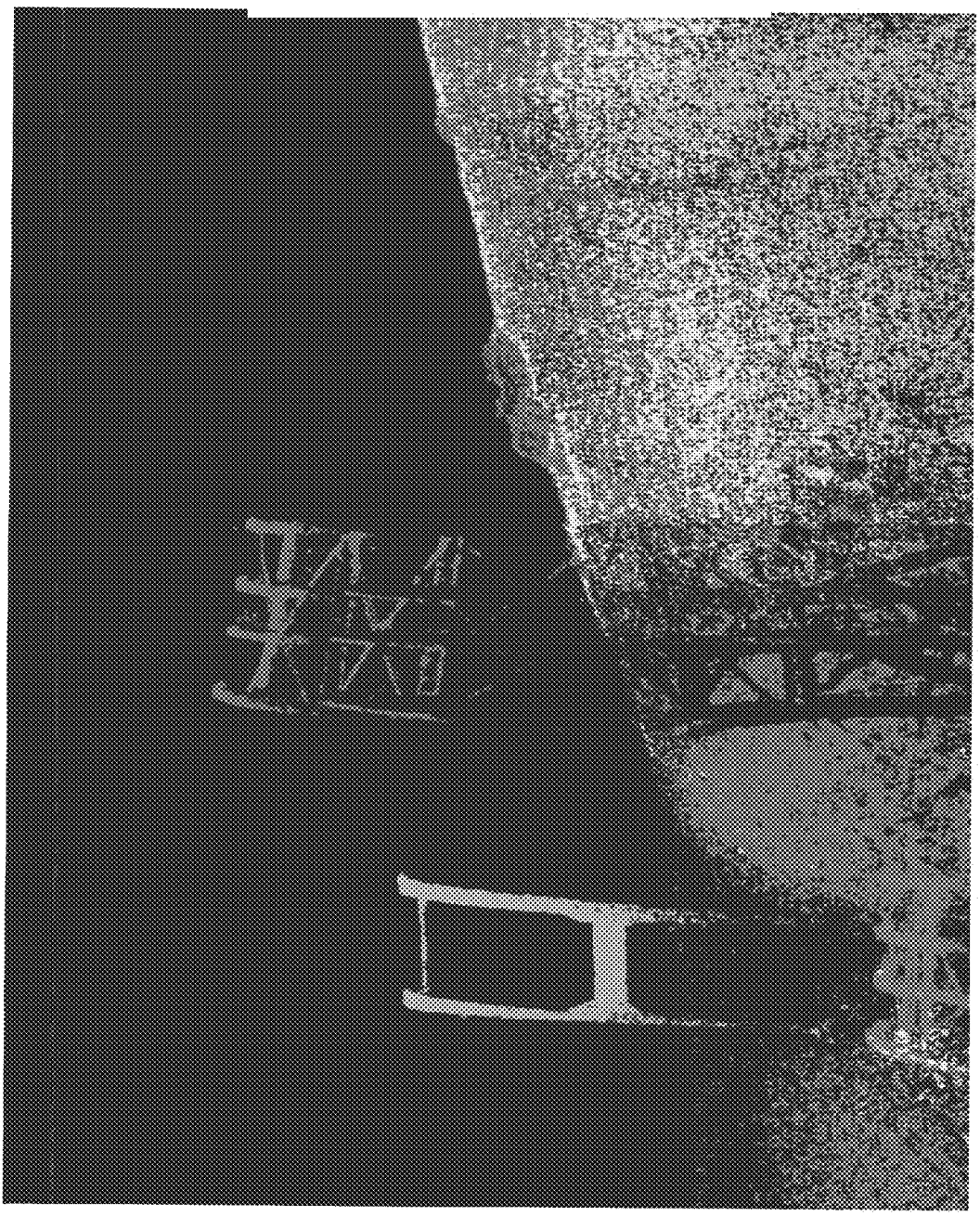
Figure 6:

FIGS. 4-7 are sonar images rendered in color, as would be generated by a sonar imaging system constructed in accordance with embodiments of the invention. FIG. 4 is a color image showing an example of vegetation growing from a lakebed. FIG. 5 is a color image showing how a man-made structure resting on the lakebed, while FIG. 6 is a color rendering of fish swimming near the lakebed, as would be generated by a sonar imaging system constructed in accordance with an embodiment of the invention.

Figure 7:
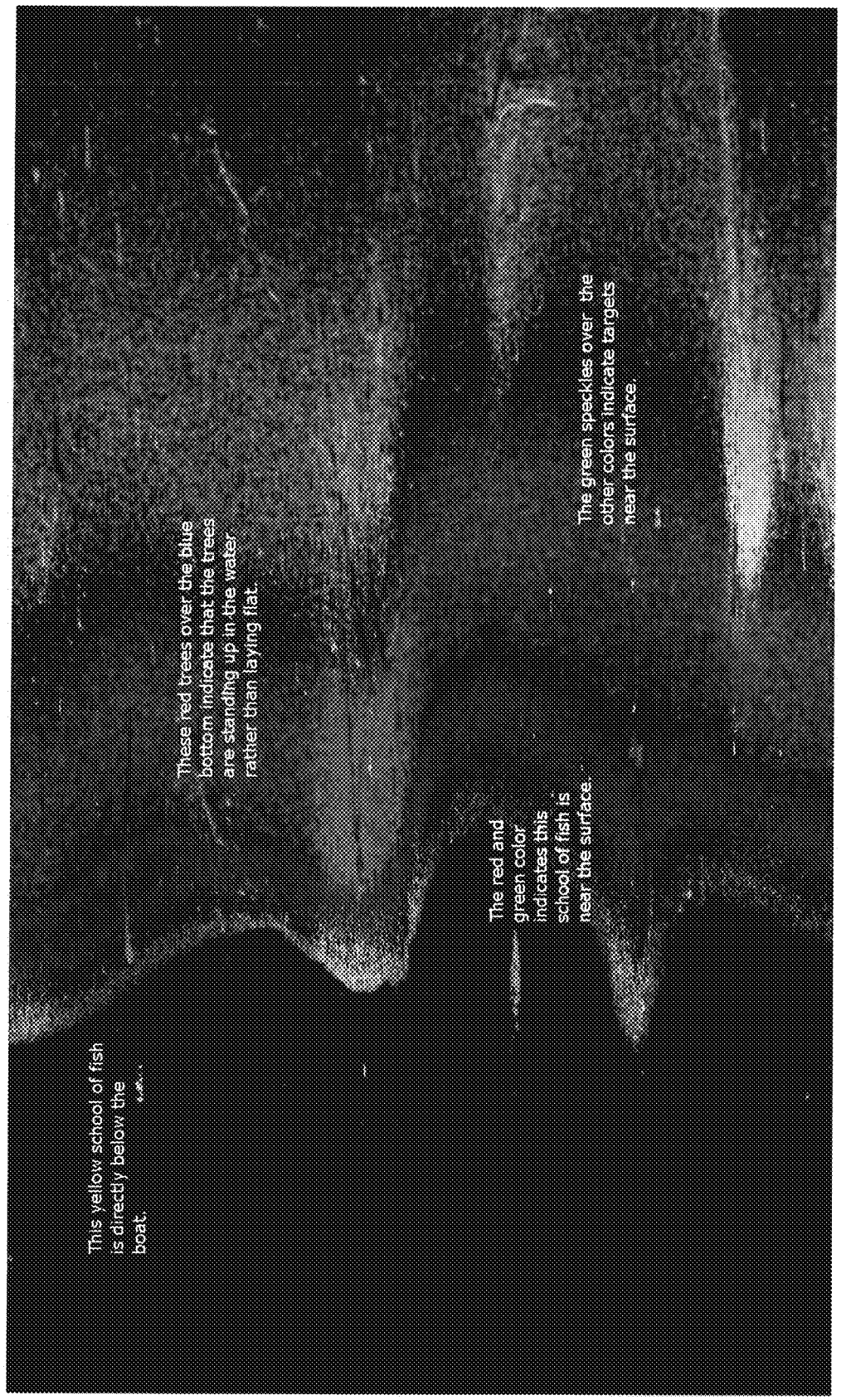

In a particular embodiment, the sonar imaging system 18 includes a plurality of acoustic sonar receiving elements 104 (shown in FIG. 2), where the sonar image rendered from each receiving element is rendered in a different color (see FIG. 7). With respect to FIG. 3, for example, the image generated by sonar returns 112 could be rendered in a first color; the image generated by sonar returns 114 could be rendered in a second color; the image generated by sonar returns 116 could be rendered in a third color, and so on. The sonar return 110 from the down imaging elements 28 could also be rendered in a unique color. As explained above, adjacent sonar returns may have some degree of overlap. This may be shown by blending the colors of adjacent sonar returns to show the degree of overlap on the sonar-generated image.

In a particular embodiment, the control head unit 22 (shown in FIG. 1) of the sonar imaging system 18 (shown in FIG. 1), which includes the displays 62 (shown in FIG. 1), and electronics and processing circuitry to process the sonar return signals for display to the user, is configured to assign a unique color to the sonar return signal from each separate acoustic sonar receiving element 104 (shown in FIG. 2). In another example different from the one described above, sonar return data from the left-side side scan sonar element 26 (shown in FIG. 1) could have its intensity value assigned to the color red, while sonar return data from the right side side-scan sonar element 26 could have its intensity value assigned to the color green. The displayed result would be a sonar image rendered with a red/green/yellow color value for a radius from the transducer assembly 20 (shown in FIG. 1) using the sonar raw intensity data. The resulting display would show objects to the left of the boat 105 colored primarily in red, and objects to the right of the boat 105 colored primarily in green, while those object imaged in the area where the two beams overlap will appear yellow. This color differentiation allows the user to more precisely locate objects around the boat 105, and better identify objects that might have been indistinguishable in a conventional sonar display.

A similar color scheme is used in FIG. 7. The view of FIG. 7 shows a sonar image generated by a transducer assembly 20 (shown in FIG. 1) having a side-scan sonar acoustic imaging element 102 with multiple receive-only sonar elements 104 (shown in FIG. 2). The water column directly beneath the boat 105 (shown in FIG. 3) is shown as black. The first receive-only sonar element 104, arranged to receive the return 118 (shown in FIG. 3) from a portion of the beam directed nearest the bottom of the boat 105 (e.g., about 75 degrees down from the surface or so), is yellow; the second receive-only sonar element 104, configured to receive the return 116 (shown in FIG. 3) from the portion of the beam adjacent to the first portion (e.g., about 60 degrees down from surface), is blue; the third receive-only sonar element 104, configured to receive the return 114 (shown in FIG. 3)

from the next adjacent portion of the beam (e.g., about 45 degrees down from surface), is red; and the fourth receive-only sonar element, configured to receive the return 112 (shown in FIG. 3) from the portion of the beam nearest the surface (e.g., about 30 degrees down from surface), is green. The color of the sonar returns 112-118, painted on the display screen, corresponds to which receive-only sonar element 104 the sonar data comes from. Thus, when a user sees a school of fish fading from red to green, the user knows the school is between 30 and 45 degrees down from the surface. If a tree is shown as red over the blue bottom, the user knows the tree is standing up into the red beam rather than lying flat. If the tree were lying flat on the bottom, it would be shown as blue.

As stated above, this concept can be extended to sonar systems with a variable number of acoustic sonar transmitting and receiving elements where, for example, the size of the fan-shaped beam received by from each receiving element 104 (shown in FIG. 2) could range from as little as 10 degrees to more than 90 degrees. In some embodiments, the sonar beam from each transmitting element 76, 82, 88 (shown in FIG. 1) is conical and can be directed to any are around or below the boat 105. The beam generated from each of the acoustic sonar elements would have its own color such that the sonar image generated for the display could be made up of four, six, or more distinct colors, as well as additional shades or colors where the beams overlap. By displaying raw sonar data from different acoustic sonar elements in different color palettes, a color gradient is created which indicates an object's position as a function of its angle down from the horizon.

Figure 8:
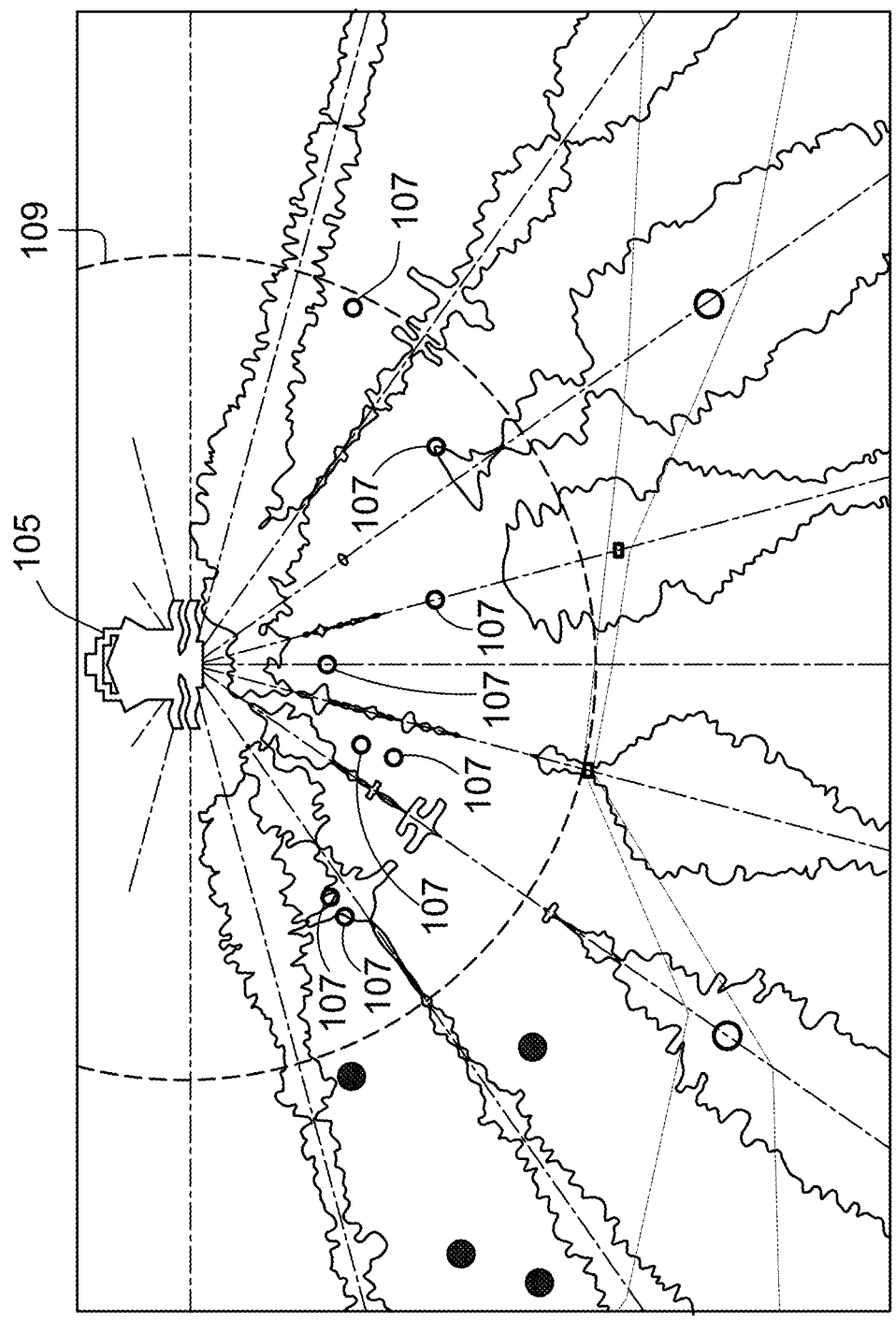
FIG. 8 is a cross-sectional view of the water beneath the transducer assembly, in accordance with an embodiment of the invention.

Further, using this method, the underwater object, or target, can be more precisely located using sonar data from adjacent sonar return beams to provide both real time and calculated data on the targets 107. As such, this method allows the user to obtain a view showing a cross-section of the water going into the display 62 (shown in FIG. 1) screen. Such a cross-section is shown in FIG. 8. This figure shows boat 105 and a cross-sectional view of the water beneath the boat 105 in a transverse plane with respect to the direction of movement for the transducer assembly 20 (shown in FIG. 1), or more generally in a plane perpendicular to the boat's direction of travel. Multiple targets 107 are identified on the display 62 and shown in the cross-sectional view with a radius 109. The calculated positions for the targets 107 can be overlaid on the display 62 screen showing their actual lateral distance from the boat 105 (i.e., transducer assembly 20) as well.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sonar imaging system comprising:
   a control head with a user interface and a display unit for displaying a sonar-generated image;
   a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;
   wherein the sonar transducer assembly comprises a second side scan acoustic sonar element, a first sonar beam from the first side scan acoustic imaging sonar element being directed in a different direction than a second sonar beam from the second side scan acoustic sonar element;
   wherein the sonar transducer assembly includes four sonar beam receiving elements for each side scan acoustic imaging sonar element, each sonar beam receiving element configured to receive a different portion of a return beam from its associated side scan acoustic imaging sonar element.

2. The sonar imaging system of claim 1, wherein there is at least some overlap between the received portions of the return beam for adjacent sonar beam receiving elements.

3. A sonar imaging system comprising:
   a control head with a user interface and a display unit for displaying a sonar-generated image:
   a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;

wherein each sonar beam receiving element is positioned at an angle different from that of any other plurality of sonar beam receiving element;

wherein the plurality of sonar beam receiving elements comprises four sonar beam receiving elements, each with an orientation angled from 15 to 25 degrees relative to any adjacent sonar beam receiving element.

4. A sonar imaging system comprising:

a control head with a user interface and a display unit for displaying a sonar-generated image;

a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;

wherein each sonar beam receiving element is positioned at an angle different from that of any other plurality of sonar beam receiving element;

wherein each sonar beam receiving element is angled such that it receives a portion of the return beam received by any adjacent sonar beam receiving element.

5. A sonar imaging system comprising:

a control head with a user interface and a display unit for displaying a sonar-generated image;

a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;

wherein the control head is configured to process signals from the plurality of sonar beam receiving elements, and to generate a sonar image for which a depth of a detected objected is indicated by a color or intensity of an icon that represents the detected object.

6. The sonar imaging system of claim 5 wherein each sonar beam receiving element is positioned at an angle different from that of any other plurality of sonar beam receiving element.

7. The sonar imaging system of claim 5 wherein the sonar transducer assembly comprises a second side scan acoustic sonar element, a first sonar beam from the first side scan acoustic imaging sonar element being directed in a different direction than a second sonar beam from the second side scan acoustic sonar element.

8. The sonar imaging system of claim 7, wherein the sonar transducer assembly is configured to mount to a hull of a boat, such that the two side scan acoustic sonar elements and eight sonar beam receiving elements provide signals to the control head to produce sonar images of the underwater regions to each side of the boat, the sonar images indicating a depth and lateral distance of an underwater object relative to a position of the boat.

9. A sonar imaging system comprising:

a control head with a user interface and a display unit for displaying a sonar-generated image;

a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;

wherein the sonar transducer assembly comprises a second side scan acoustic sonar element, a first sonar beam from the first side scan acoustic imaging sonar element being directed in a different direction than a second sonar beam from the second side scan acoustic sonar element;

wherein a first sonar return from the first side scan acoustic imaging sonar element is rendered in a first color on the display unit, and a second sonar return from the second side scan acoustic imaging sonar element is rendered in a second color on the display unit, the second color being different from the first color.

10. A sonar imaging system comprising:

a control head with a user interface and a display unit for displaying a sonar-generated image:

a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;

wherein signals, provided to the control head by the plurality of sonar beam receiving elements, are used to generate a 3-D underwater image.

11. The sonar imaging system of claim 10 wherein signals, provided to the control head by the plurality of sonar beam receiving elements, are used to generate a topographical rendering of a lakebed, riverbed, or seabed.

12. A sonar imaging system comprising:
a control head with a user interface and a display unit for displaying a sonar-generated image;
a sonar transducer assembly coupled to the control head and configured to transmit sonar data to the control head, the sonar data used to generate the sonar-generated image, the sonar transducer assembly including a first side scan acoustic imaging sonar element that transmits a sonar beam, the sonar transducer assembly further including a plurality of sonar beam receiving elements, each receiving element arranged to receive a portion of the return beam from the first side scan acoustic sonar element, each of the plurality of sonar beam receiving elements configured to identify both a depth and a lateral distance of an underwater object relative to the position of the sonar transducer assembly;
further comprising a multiplexer coupled to each of the plurality of sonar beam receiving elements, the multiplexer configured to transmit, to the control head, signals from fewer than all of the plurality of sonar beam receiving elements.

13. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
further comprising disposing a second side-scan acourstic sonar element with a second plurality of sonar beam receiving elements in the sonar transducer assembly housing, the second plurality of sonar beam receiving elements configured to receive a different portion of a sonar return beam from a second laterally-directed sonar beam, wherein the second laterally-directed sonar beam is directed in a different direction than the first laterally-directed sonar beam;
further comprising rendering sonar returns from the first side-scan acoustic sonar element in a first color, and rendering sonar returns from the second side-scan acoustic sonar element in a second color different from the first color.

14. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
wherein there is at least some overlap between the received portions of the return beam for adjacent sonar beam receiving elements.

15. The method of claim 14 further comprising mounting the sonar transducer assembly to a hull of a boat.

16. The method of claim 14 further comprising disposing a second side-scan acoustic sonar element with a second plurality of sonar beam receiving elements in the sonar transducer assembly housing, the second plurality of sonar beam receiving elements configured to receive a different portion of a sonar return beam from a second laterally-directed sonar beam, wherein the second laterally-directed sonar beam is directed in a different direction than the first laterally-directed sonar beam.

17. The method of claim 14 further comprising positioning each sonar beam receiving element at an angle that is different from that of any other sonar beam receiving element.

18. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
further comprising positioning each sonar beam receiving element at an angle that is different from that of any other sonar beam receiving element;
wherein positioning each sonar beam receiving element comprises orienting each sonar beam receiving element at an angle from 15 to 25 degrees relative to any adjacent sonar beam receiving element.

19. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;

wherein generating a sonar image for display on the display unit comprises generating a 3-D sonar image for display on the display unit.

20. The method of claim 19 wherein generating a sonar image for display on the display unit comprises generating a topographical rendering of a lakebed, riverbed, or seabed for display on the display unit.

21. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
wherein generating a sonar image for display on the display unit comprises generating a sonar image in which the depth of an underwater object is indicated by color or intensity of an icon representing the underwater object.

22. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
further comprising multiplexing the signals from the plurality of sonar beam receiving elements to the control head.

23. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
further comprising rendering, on the display unit, the sonar returns from each of the first plurality o sonar beam receiving elements in a different color.

24. A method of sonar imaging comprising the steps of:
providing a sonar transducer assembly including a transducer assembly housing that houses a first side-scan acoustic sonar element configured to generate a laterally-directed sonar beam;
disposing a first plurality of sonar beam receiving elements in the transducer assembly housing, the first plurality of sonar beam receiving elements configured to receive a different portion of the sonar return beam from the laterally-directed sonar beam;
routing signals from the first plurality of sonar beam receiving elements to a control head coupled to the transducer assembly, the control head having a display unit;
generating a sonar image for display on the display unit, the sonar image indicating a depth and lateral distance for an underwater object, relative to a position of the sonar transducer assembly;
further comprising rendering, on the display unit, a cross-sectional view of water beneath the transducer assembly in a plane transverse to a direction of travel for the transducer assembly.

25. The method of claim 24, wherein rendering the cross-sectional view comprises using sonar data from adjacent sonar return beams to provide both real time and calculated data for locating the underwater object.

26. A method of sonar imaging comprising the steps of:
providing a sonar transducer assembly with a transducer assembly housing that houses a first side-scan acoustic sonar element configured to generate a first laterally-directed sonar beam in a first direction, and a second side-scan acoustic sonar element configured to generate a second laterally-directed sonar beam in a second direction different from the first direction, wherein the first and second side-scan acoustic sonar elements are positioned such that there is some overlap between the first and second laterally-directed sonar beams;
routing signals from the plurality of sonar beam elements to a control head coupled to the transducer assembly, where the control head has a display unit;
rendering a multi-color sonar image for display on the display unit, wherein sonar beam returns from each of the first and second side-scan acoustic sonar elements is rendered in a different color.

27. The method of claim 26, wherein an underwater object located in an underwater region corresponding to the overlap between the first and second laterally-directed sonar beams is rendered on the display unit by blending the different colors at the same location on the display unit.

28. The sonar imaging system of claim 10, wherein the control head is configured to display the sonar data from each of the plurality of sonar beam receiving elements in a different color.

* * * * *